US005178792A

United States Patent [19]

Harada et al.

[11] Patent Number: 5,178,792

[45] Date of Patent: Jan. 12, 1993

[54] MACROCYCLIC COMPOUNDS AS COMPONENT FOR FERROELECTRIC LIQUID CRYSTAL MIXTURES

[75] Inventors: Takamasa Harada, Inzai, Japan; Norbert Rösch, Frankfurt am Main; Peter Wegener, Königstein/Taunus, both of Fed. Rep. of Germany

[73] Assignee: Hoechst Aktiengesellschaft, Frankfurt am Main, Fed. Rep. of Germany

[21] Appl. No.: 683,263

[22] Filed: Apr. 10, 1991

[30] Foreign Application Priority Data

Apr. 12, 1990 [DE] Fed. Rep. of Germany ....... 4011804

[51] Int. Cl.[5] ...................... C09K 19/06; C09K 19/34; C09K 19/52; C09K 19/30

[52] U.S. Cl. ............................ 252/299.6; 252/299.01; 252/299.61; 252/299.63; 252/299.2; 252/299.64; 252/299.65; 252/299.66; 252/299.67; 252/299.5

[58] Field of Search ...................... 252/299.01, 299.66, 252/299.67, 299.68, 299.5, 299.63, 299.64, 299.65, 299.61, 299.2, 299.6

[56] References Cited

U.S. PATENT DOCUMENTS

| | | | |
|---|---|---|---|
| 4,077,900 | 3/1978 | Pohl et al. | 252/299.01 |
| 4,367,924 | 1/1983 | Clark et al. | 359/103 X |
| 4,918,217 | 4/1990 | Dal Canale et al. | 560/73 |
| 5,020,881 | 6/1991 | Matsuda et al. | 350/333 |

FOREIGN PATENT DOCUMENTS

| | | |
|---|---|---|
| 0350842 | 1/1990 | European Pat. Off. . |
| 3939697 | 4/1989 | Fed. Rep. of Germany . |
| 2344617 | 10/1977 | France . |
| WO-9015117 | 12/1990 | PCT Int'l Appl. . |
| WO-9108272 | 6/1991 | PCT Int'l Appl. . |

*Primary Examiner*—Robert L. Stoll
*Assistant Examiner*—C. Harris
*Attorney, Agent, or Firm*—Curtis, Morris & Safford

[57] ABSTRACT

A liquid crystal mixture composed of at least two components containing as one component a macrocyclic compound of the general formula (1)

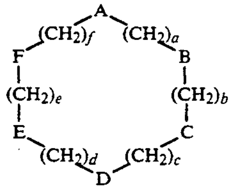

(1)

in which a, b, c, d, e, f, independently of one another, are an integer from zero to 4, a+b+c+d+e+f being greater than 7, and —A—, —B—, —C—, —D—, —E—, —F—, identical or different, are, for example, $-CH_2-$, $-CH=CH-$, —CO— or —COO—, leads in FLC displays to the formation of a uniform alignment and avoids twist states, which is reflected in a significantly improved contrast.

6 Claims, No Drawings

MACROCYCLIC COMPOUNDS AS COMPONENT FOR FERROELECTRIC LIQUID CRYSTAL MIXTURES

DESCRIPTION

The invention relates to the use of macrocyclic compounds in ferroelectric liquid crystal mixtures and the use of these mixtures in electrooptical switching and display elements.

Electrooptical switching and display elements which contain ferroelectric liquid crystal mixtures ("FLC light valves") are known, for example, from EP-B 0,032,362 (= U.S. Pat. No. 4,367,924). Liquid crystal light valves are devices which change their optical transmission properties, for example because of electrical switching, in such a manner that transmitted (and, if appropriate, again reflected) light is intensity-modulated.

Examples are the known wristwatch and pocket calculator displays or liquid crystal displays in the areas of OA (office automation) or TV (television). However, they also include optical shutters, so-called "light shutters", such as are used, for example, in copying machines, printers, welding goggles, polarized spectacles for three-dimensional viewing and the like. So-called "spatial light modulators" are also included in the application range of liquid-crystalline light valves (see Liquid Crystal Device Handbook, Nikkan Kogyo Shimbun, Tokyo, 1989; ISBN 4-526-02590-9C 3054 and articles quoted therein).

The structure of electrooptical switching and display elements is such that the FLC layer is enclosed on both sides by layers which conventionally contain, in the following order starting from the FLC layer, at least one electrically insulating layer, electrodes and an outer sheet (for example made of glass). Moreover they contain a polarizer, if they are operated in the "guest-host" or in the reflective mode, or two polarizers, if the birefringence mode is utilized.

Orientation layers together with a sufficiently small spacing of the outer sheets make the FLC molecules of the FLC mixture adopt a configuration in which the molecules are parallel to one another with respect to their longitudinal axes and the smectic planes are arranged perpendicular or inclined to the orientation layer. In this arrangement, the molecules, as is known, have two equivalent orientations between which they can be switched by applying a pulsed electric field, i.e. FLC displays are capable of bistable switching. The switching times are inversely proportional to the spontaneous polarization of the FLC mixture and are in the range of μs.

The main advantage of this type of FLC displays compared with the LC displays which are still being used to a large extent in industrial practice is considered to be the attainable multiplex ratio, i.e. the maximum number of the lines addressable in the time-sequential process "multiplex process", which is substantially greater in FLC displays than in conventional LC displays. This electrical addressing is essentially based on the above-mentioned pulse addressing which has been described by way of example in SID 85 DIGEST p. 131 (1985).

However, a significant disadvantage of FLC displays is that in the non-addressed state they display an undesirable non-uniformity of the director (i.e. the preferred direction of the molecule), and thus one or more so-called twist states (M. A. Handschy, N. A. Clark, S. T. Lagerwall; Phys. Rev. Lett. 51, 471 (1983) M. Glogarova, J. Pavel; J. Phys. (France) 45, 143 (1984) N. Higi, T. Ouchi, H. Takezoe, A. Fukuda; Jap. J. Appl. Phys. 27, 8 (1988)).

In the memory state and in the multiplex operation, this non-uniformity leads to a strong decline in the contrast in the display, in particular due to the fact that the opaque state becomes considerably lighter (gray dark state). Moreover, the appearance of the twist state is linked to a wavelength dispersion which can lead to distorted colors in the display.

The attempt has already been made to suppress the appearance of the interfering twist states by means of a suitable choice of orientation layers, which, however, has so far only achieved moderate success. Very often, the almost uniform states which sometimes occur (e.g. if SiO vapor deposition at an angle is used) turned out to be unstable and decomposed again into twist states.

The occurrence of twist states seems to be favored in particular if ferroelectric liquid crystal mixtures having high spontaneous polarization are used (M. A. Handschy and N. A. Clark; Ferroelectrics 59, 69 (1984)). However, such mixtures are particularly suitable for the development of highly informative displays, because they result in short switching times.

The object of the present invention is to provide FLC mixtures which, in FLC displays, do not form twist states but lead to uniform states and thus to a high contrast.

Surprisingly, it has now been found that the occurrence of the twist states described above can be suppressed by adding macrocyclic compounds to FLC mixtures.

In DE-A 3,939,697, the use of cryptands and coronands—which can also be macrocycles—in liquid crystal mixtures for suppressing so-called ghost images has already been presented. In contrast, the macrocyclic compounds which are used now—in which the ion complexing power is not the most important aspect—suppress the occurrence of twist states, independent of the orientation layer used in each case.

Accordingly, the object is achieved by providing a ferroelectric liquid crystal mixture composed of at least two components, which contains as one component at least one macrocyclic compound of the general formula (1)

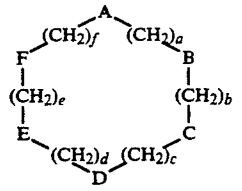

(1)

in which a, b, c, d, e, f, independently of one another, are an integer from zero to 4, a+b+c+d+e+f being greater than 7, and —A—, —B—, —C—, —D—, —E—, —F—, identical or different, are $-CH_2-$, $-CHR'-$, $-CH=CH-$, $-CR=CR'-$, $-C\equiv C-$, -continued

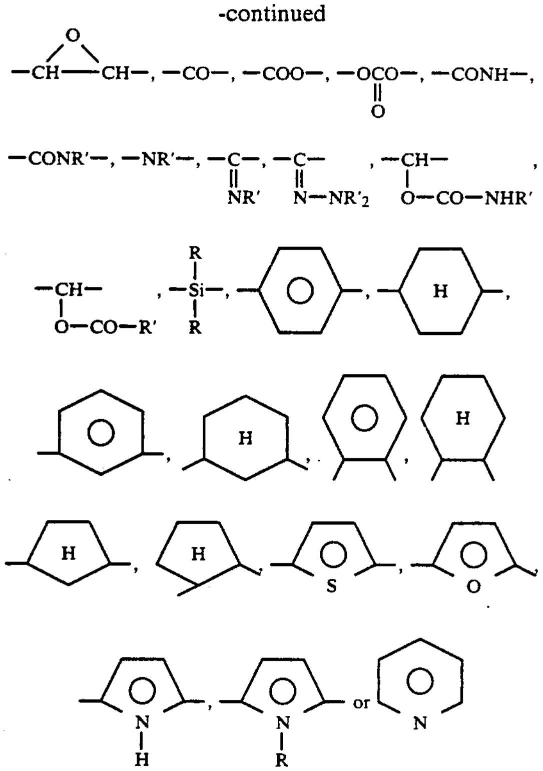

in which

R can be alkyl of 1 to 12 carbon atoms, and

R' can be alkyl of 1 to 12 carbon atoms, in which a —$CH_2$— group can be replaced by —O—, —COO—or —OCO—, phenyl or Cl, F or CN.

Preferably a ferroelectric liquid crystal mixture is used containing a macrocyclic compound of the formula (1), in which the symbols have the following meaning: a, b, c, d, e, f, R, R' are as described above, —B—, —C—, —E—, —F— are a —$CH_2$— group and —A—, —D—, identical or different, are

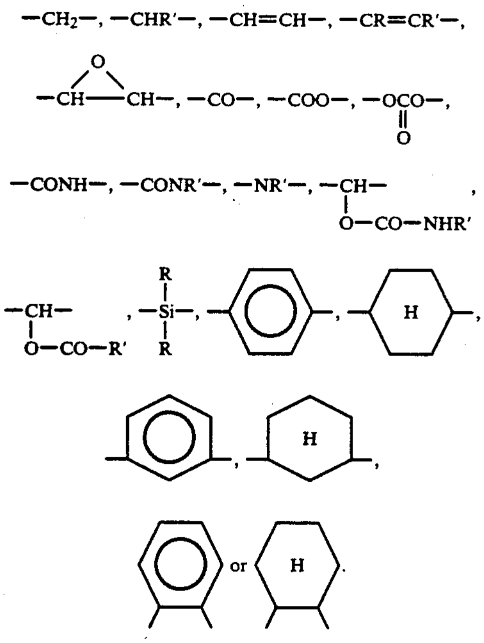

Particularly preferably, macrocyclic compounds according to the formula (1) are used in which the symbols have the following meaning:

a, b, c, d, e, f, independently of one another are an integer from zero to 3,

—B—, —C—, —E—, —F— are a —$CH_2$— group —A—, —D—, identical or different, are

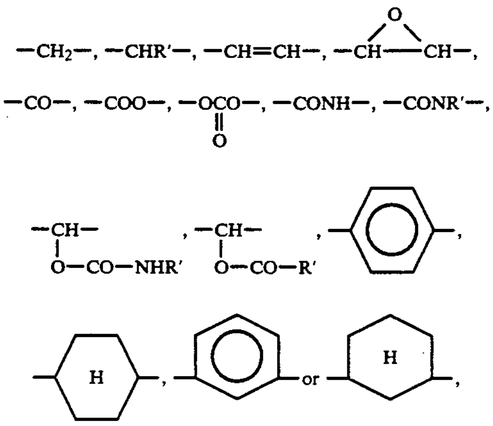

in which

R is alkyl of 1 to 12 carbon atoms and

R' is alkyl of 1 to 12 carbon atoms or phenyl.

Particularly preferably, the groups —A—, —D— have the following meaning:

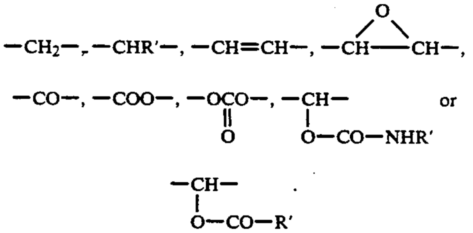

In general, the mixture according to the invention contains 0.01 to 10 mol %, in particular 0.1 to 10 mol %, of the macrocyclic compound.

In principle, a wide range of macrocyclic compounds—i.e. cyclic compounds of 13 or more members; for restrictions, see, for example, O. A. Neumüller (ed.), Römpps Chemie-Lexikon, 8th edition, Frankh'sche Verlagsbuchhandlung, Stuttgart 1989—is suitable for use in liquid crystal mixtures, but macrocycles of the formula (1) just described are particularly suitable for suppressing twist states. The mixtures according to the invention can also contain two or more different compounds of the formula (1). On the whole, 0.01 to 10 mol % of macrocyclic compounds are present in the FLC mixture.

As a rule, the liquid crystal mixtures comprise 2 to 20, preferably 2 to 15, components, of which at least one is a macrocylic compound. The other components are preferably selected from the known compounds having nematic, cholesteric and/or tilted/ smectic phases, which include, for example, Schiff's bases, biphenyls, terphenyls, phenylcyclohexanes, cyclohexylbiphenyls, pyrimidines, cinnamic esters, cholesteric esters, various bridged polynuclear esters of p-alkylbenzoic acids having polar end groups. In general, the commercially available liquid crystal mixtures are present as mixtures of a wide range of components even before the compound(s) according to the invention is(are) added, at least one of which components being mesogenic, i.e. a compound which as a derivative or in a mixture with certain components shows a liquid crystal phase [i.e. is expected to form at least one enantiotropic (clearing temperature>melting temperature) or monotropic (clearing temperature<melting temperature) mesophase].

The liquid crystal mixtures described can be advantageously incorporated in electrooptical switching and display devices.

The switching and display devices according to the invention (FLC light valves or displays) contain, inter alia, the following components: a liquid-crystalline mixture according to the invention (containing a macrocyclic compound), support plates (e.g. made of glass or plastic), coated with transparent electrodes (two electrodes), at least one orientation layer, spacers, adhesive frame, polarizers and for color displays thin color filter films. Further possible components are antireflection, passivation, compensation and barrier coatings and electric non-linear elements, such as, for example, thin-film transistors (TFT) and metal/insulator/metal (MIM) elements. The general structure of liquid crystal displays has already been described in detail in standard monographies (e.g. E. Kaneko, "Liquid Crystal TV Displays: Principles and Applications of Liquid Crystal Displays", KTK Scientific Publishers, 1987, pages 12–30 and 163–172).

Among the FLC light valves, switching devices which are driven by the multiplex process are preferred. Liquid crystal cells which operate in the SSFLC technique ("surface stabilized ferroelectric liquid crystal") and in which the cell thickness (i.e. the spacing of the outer sheets) is 1 to 20 μm are particularly preferred. A cell thickness of 1 to 10 μm, in the birefringence mode in particular of 1.2 to 3 μm, is particularly preferred.

Furthermore, the compounds according to the invention are advantageously used for the operation of an SSFLC display in the so-called "guest-host mode", in which the optical effect is not based on birefringence phenomena but on the anisotropic absorption of dichroic dyes which are dissolved in an FLC matrix.

The compounds according to the invention suppress the occurrence of twist states for various geometries of the smectic layers in the SSFLC cell (see, for example, H. R. Dübal, C. Escher, D. Ohlendorf; Proc. 6th Intl. Symp. on Electrets, Oxford, England (1988)). This is especially true of the so-called "virgin texture" in which the smectic layers are arranged at an angle ("chevron" geometry) and of the "bookshelf" or "quasi-bookshelf" geometry in which the smectic layers are arranged perpendicular to the glass plates (see Y. Sato et al., Jap. J. Appl. Phys. 28, 483 (1989)). The use of the compounds according to the invention in this "bookshelf" geometry is particularly advantageous, since this not only leads to good dark states but also to high transmission of the bright state due to the large effective switching angle.

Furthermore, it has been found that the compounds according to the invention facilitate in FLC mixtures the field-induced generation of a homogeneous "quasi-bookshelf" geometry (Y. Sato et al., Jap. J. Appl. Phys. 28, 483 (1989)).

The invention is illustrated by the examples which follow:

EXAMPLES

Macrocyclic compounds, in particular those of the general formula (1), can in general be prepared by the following methods:

1) by ring closure according to the Ziegler dilution principle (Ziegler, Houben-Weyl 4/2, p. 738–740, 755–764), for example from α,ω-diesters using an alkali metal to give acyloins (Finley, Chem. Rev. 64, 573–589 (1964)), or by Dieckmann ester condensation of long-chain α,ω-diesters or α,ω-dinitriles (Bloomfield, Tetr. Lett. 591 (1968)),
2) by ring enlargement reactions starting from readily accessible $C_{12}$- or $C_{16}$-carbocyclic ketones and/or olefins, for example by the method of E. Müller using diazomethane (Müller, Heischbiel, Tetr. Lett. 2809 (1964)) or diazo acetate (Mock, Hartmann, J. Org. Chem. 42, 459, 466 (1977)) catalyzed by acid, by Bayer-Villiger reaction using peracids to give lactones (Krow, Tetrahedron 37, 2697 (1981)), carbonates (Bailey, Slink, J. Am. Chem. Soc. 104, 1769 (1982)) or epoxides by the method of Schmidt or using hydrazoic acid to give lactones (Krow, Tetrahedron 37, 1283 (1981)).

EXAMPLE 1

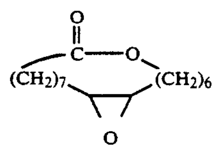

2.0 g of 8-cyclohexadecen-1-one (cis/trans mixture) are refluxed in 50 ml of dichloromethane together with 6.0 g of 70% m-Cl-perbenzoic acid for 16 hours. After cooling, the precipitated m-Cl-benzoic acid is filtered off, the filtrate is washed with 2N sodium carbonate solution and water, dried, and concentrated; yield: 1.95 g. Purification by chromatography ($SiO_2$/hexane/ethyl acetate 95:5) gives 1.1 g of a viscous clear liquid which crystallizes upon standing. NMR and mass spectroscopy data confirm the abovementioned structure.

EXAMPLE 2

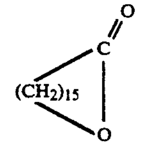

Starting from 2.0 g of cyclohexadecanone and 4 g of perbenzoic acid, the saturated lactone (2-oxacycloheptadecan-1-one) is obtained analogously as a wax-like light crystalline material.

EXAMPLE 3

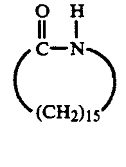

1 ml of concentrated sulfuric acid is added to 1 g of cyclohexadecanone, dissolved in 10 ml of chloroform, at 20° C., and 0.5 g of sodium azide is added in portions with stirring. The mixture is then refluxed for 1 hour and then poured onto ice; the $CHCl_3$ phase is separated off, dried and concentrated. Weight 1.0 g. Chromatography ($SiO_2$/ethyl acetate) gives 0.4 g of crystals, melting point 120°-121° C., which by IR, NMR and mass spectrum conform to the above structure of a 17 ring lactam.

EXAMPLE 4

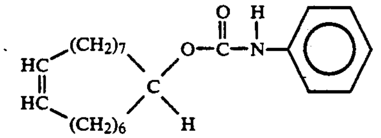

2.0 g of 8-cyclohexadecen-1-ol, prepared from the corresponding ketone by reduction using $NaBH_4$ in ethanol, are refluxed in 20 ml of dichloromethane together with 1 g of phenyl isocyanate for 3 hours. The solution is concentrated, and the residue is purified by chromatography ($SiO_2$/hexane:ethyl acetate 95:5) to give 800 mg of crystals; melting point 86°-87° C. The analytical data confirm the structure given.

EXAMPLE 5

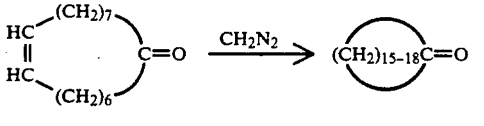

1 ml of $BF_3$ etherate is added to 20 g of 8-cyclohexadecen-1-one, dissolved in 50 ml of ether. 325 ml of ether in which 145 mmol of diazomethane are dissolved are added dropwise with ice cooling and stirring at such a rate that rapid decolorization takes place. After half of the solution has been added, another 1 ml of $BF_3$ etherate is added. After the addition is completed, the solution is washed with $Na_2CO_3$ solution and water, dried and concentrated to give 24 g of crude product which by GC analysis contains a mixture of cyclohexa-, cyclohepta-, cycloocta- and cyclononadecanone. The substances can be separated by spinning band distillation, since the boiling points differ by about 10°; boiling point for the $C_{18}$ ketone 145°/0.1 mm. Fine purification is carried out by preparative GC.

EXAMPLE 6

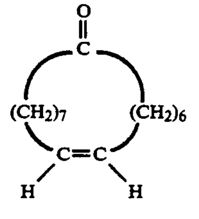

The compound shown can be synthesized by methods known from the literature (see, for example, B. D. Mookherjee, R. W. Trenkle, R. R. Patel, J. Org. Chem. , 3266 (1971).

EXAMPLE 7

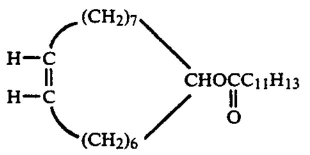

0.5 g of sodium borohydride is added to a solution of 2 g of 8-cyclohexadecen-1-one in 10 ml of ethanol. After stirring at 60° C. for 3 hours, the mixture is brought to a pH of 3 with 2N HCl and evaporated to dryness in vacuo. The residue is taken up in dichloromethane, and the extract is washed until neutral. After evaporation of the solvent, the product is recrystallized from hexane; 1.8 g of 8-cyclohexadecen-1-ol as colorless crystals of melting point 57°-58° C.

1.8 g of dodecanoyl chloride and 2.0 ml of triethylamine are added to a solution of 1.65 g of 8-cyclohexadecen-1-ol in 25 ml of diethyl ether. After heating to reflux for 5 hours, the mixture is poured into 100 ml of $H_2O$, the organic phase is separated off, the aqueous phase is extracted with 25 ml of diethyl ether, and the combined organic phases are evaporated in vacuo. Purification of the residue by chromatography on silica gel using dichloromethane/hexane 1:3 gives 1.05 g of 8-cyclohexadecen-1-yl dodecanoate as a viscous oil.

EXAMPLE 8

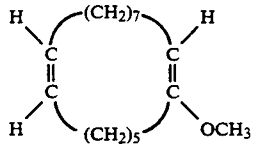

0.1 ml of HCl (conc.) is added to a solution of 10 g of 8-cyclohexadecen-1-one in 25 ml of methyl orthoformate. After 12 hours, 0.1 g of benzenesulfonic acid is added and first methyl formate and then excess ortho ester are distilled off by slowly increasing the temperature. The mixture is brought to a pH of 10 by adding 0.4 ml of sodium methoxide solution (30% in methanol), and the product is distilled off at 100° to 110° C./0.1 mbar; 8.1 g as a mixture of 1-methoxycyclohexa-1,7-diene and 1-methoxycyclohexa-1,8-diene, both as a cis/trans mixture.

EXAMPLE 9

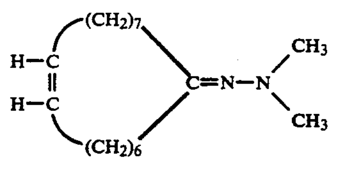

0.5 ml of N',N'-dimethylhydrazine is added to a solution of 1 ml (3.8 mmol) of 8-cyclohexadecen-1-one in 10 ml of THF. After adding a molecular sieve (3 Å, activated), the mixture is stirred at 65° C. for 70 hours. After the molecular sieve has been separated off, the mixture is freed of low-boiling components at 1 mbar. The residue (0.72 g) comprises a product with purity of 95% (GC). The IR spectrum no longer shows the carbonyl band (1710 $cm^{-1}$) of the starting material, but it shows the C=N band ($1650^{-1}$) of a hydrazone; in the $^1H$ NMR, a singlet appears at 2.4 ppm for the methyl group.

EXAMPLE 10

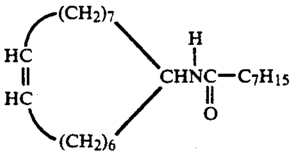

1 ml of triethylamine and 0.72 ml of octanoyl chloride are added to 1.0 g of 8-cyclohexadecen-1-amine, prepared (analogously to Synthesis 1975, 135) by reductive amination from 8-cyclohexadecen-1-one, in 10 ml of THF. After 3 hours, the precipitate formed is filtered off, and the filtrate is evaporated to dryness in vacuo. After two recrystallizations from ethyl acetate, 1.1 g of colorless crystals of melting point 87°-90° C. are obtained.

EXAMPLE 11

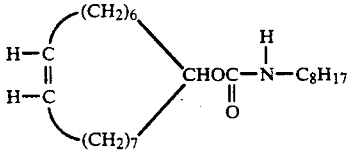

0.55 g of octyl isocyanate and 0.05 ml of triethylamine are added to a solution of 0.85 g of 8-cyclohexadecen-1-ol (preparation see Example 7) in 10 ml of THF. After 100 hours at 60° C., the mixture is evaporated to dryness in vacuo. Chromatography ($SiO_2/CH_2Cl_2$) gives 0.75 g of colorless crystals of melting point 43° C.

EXAMPLE 12

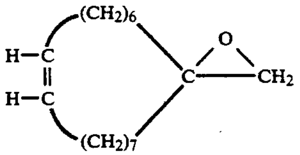

0.7 g of sodium hydride (80%) is added to 30 ml of dimethyl sulfoxide, and, after the reaction is completed, 4.5 g of trimethylsulfoxonium iodide are added. After 30 minutes at 50° C., 5 ml of 8-cyclohexadecen-1-one are added, and the mixture is maintained at 50° C. for 2 hours. After conventional hydrolytic work up, the product is purified by chromatography ($SiO_2$; hexane/ethyl acetate 95/5), giving 1.6 g of a viscous oil as the first fraction.

EXAMPLE 13

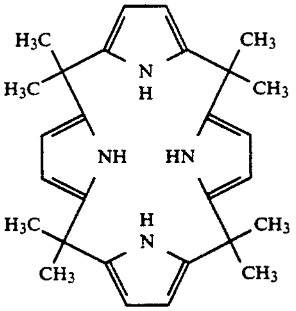

was prepared by the method of P. Rothemund, C. L. Gage, J. Am. Chem. Soc. 77, 3340 (1955); melting point: 294° C.

EXAMPLE 14

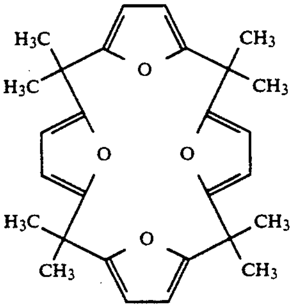

was prepared by the method of M. De Sousa-Hecely, A. J. Rest, J. Chem. Soc. Chem. Comm. 1981, 149; melting point: 241° C.

EXAMPLE 15

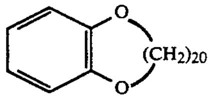

was prepared by the method of L. Mandolini, B. Masci, J. Org. Chem. 42, 2840 (1977); melting point: 56° C.

WORKING EXAMPLES

An LC basic mixture is prepared from the following 8 components (in mol %)

| | |
|---|---|
| 17.70 | 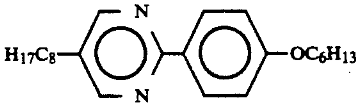 |
| 11.80 | 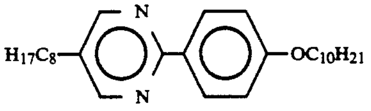 |

-continued

| | |
|---|---|
| 15.88 | 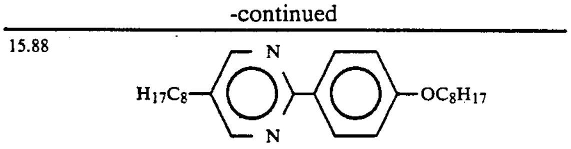 |
| 11.06 | 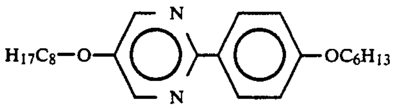 |
| 5.11 | 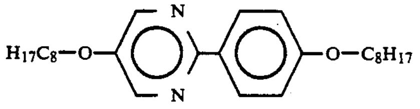 |
| 11.67 | 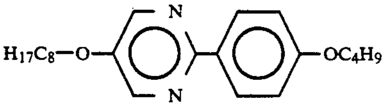 |
| 9.28 | 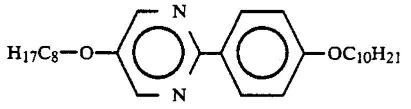 |
| 17.50 | 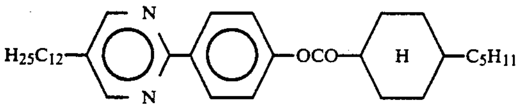 |

The mixture has the following phase transitions:

$S_c$ 69 $S_A$ 76 N 92 I

The following compounds are used as examples for doping substances:

Doping substance D1

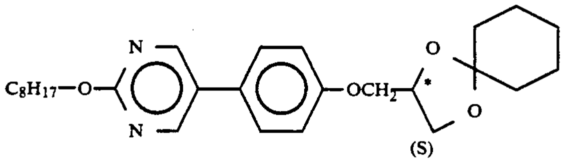

-continued

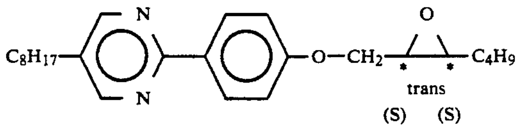

Taking into account the above data, the LC mixture mentioned, the doping substances and the macrocyclic compounds mentioned in the examples are used to prepare the following working examples (FLC mixtures). The switching angle, the transmission properties and the contrast in measurement cells (manufactured by E. H. C. Inc., Tokyo) which are filled with the mixtures mentioned are determined as the measure for suppressing twist states.

WORKING EXAMPLE A1

The FLC comparison mixture has the following composition (in mol %):

| | |
|---|---|
| LC basic mixture | 78.3% |
| Doping substance D1 | 4.7% |
| Doping substance D2 | 9.0% |
| Doping substance D3 | 8.0% |

and the phase transition $S_c$*60$S_a$*70N*79I having a spontaneous polarization of 55 nC $cm^{-2}$.

The switching angle (2 $\theta_{eff}$) is investigated for this comparison mixture and for an FLC mixture which in addition contains a macrocyclic compound from Example 6. For this purpose, a measurement cell containing the corresponding FLC mixture is aligned under a polarizing microscope (equipped with revolving stage). The switching angle of addressed cells can be determined by rotating the microscope stage. After adding the corresponding macrocyclic compounds, the FLC mixture shows significantly improved properties, which is reflected in the corresponding measured results.

WORKING EXAMPLES A2 to A5

Analogously to A1, the effective switching angle (2 $\theta_{eff}$) is determined for each of the FLC mixtures containing the macrocyclic compounds from Examples 1, 3, 4 and 5. The results (see Table 1) show the significant improvement in the switching angle (and thus the contrast in the display) compared with the comparative example (without macrocyclic compound).

TABLE 1

| | Macrocycles in FLC mixtures (working examples A1 to A5) | | | | | |
|---|---|---|---|---|---|---|
| | Comparison (without macrocycles) | A1 Macrocycle from Ex. 6 | A2 Macrocycle from Ex. 1 | A3 Macrocycle from Ex. 3 | A4 Macrocycle from Ex. 4 | A5 Macrocycle from Ex. 5 |
| Tilt angle 2 $\theta_{eff}$ [°] | 15 | 18 | 20.5 | 20 | 18 | 18 |

Doping substance D2

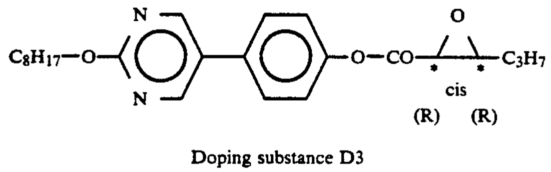

Doping substance D3

We claim:

1. A ferroelectric liquid crystal mixture composed of at least two components, which contains as one component at least one macrocyclic compound of the general formula (1)

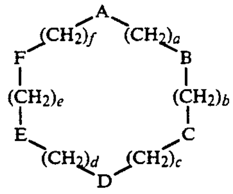

(1)

in which a, b, c, d, e, f, independently of one another, are an integer from zero to 4, a+b+c+d+e+f being greater than 7, and —A—, —B—, —C—, —D—, —E—, —F—, identical or different, are $-CH_2-$, $-CHR'-$, $-CH=CH-$, $-CR=CR'-$, (1)

$-C\equiv C-$, 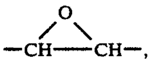, $-CO-$, $-COO-$, $-O\underset{\underset{O}{\|}}{C}O-$, $-CONH-$, $-CONR'-$, $-NR'-$, $-\underset{\underset{NR'}{\|}}{C}-$, $-\underset{\underset{N-NR'_2}{\|}}{C}-$, $-\underset{O-CO-NHR'}{\underset{|}{CH}}-$, $-\underset{O-CO-R'}{\underset{|}{CH}}-$, $-\overset{R}{\underset{R}{Si}}-$, 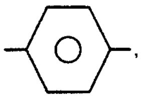,

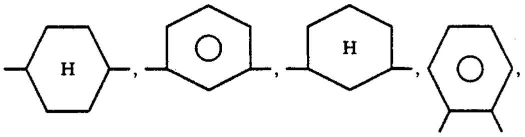

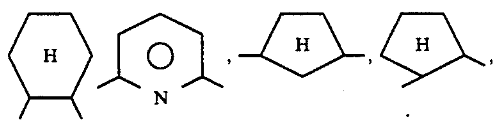

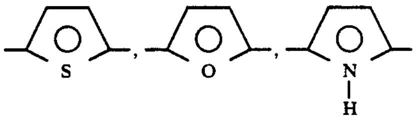 or

in which

R can be alkyl of 1 to 12 carbon atoms, and

R' can be alkyl of 1 to 12 carbon atoms, in which a —CH2— group can be replaced by —O, —COO—or —OCO—, phenyl or Cl, F or CN.

2. A liquid crystal mixture as claimed in claim 1, wherein the symbols in formula (1) have the following meaning: a, b, c, d, e, f, R, R' are as in claim 1, —B—, —C—, —E—, —F— are —CH2— and —A—, —D—, identical or different, are $-CH_2-$, $-CHR'-$, $-CH=CH-$, $-CR=CR'$, -continued

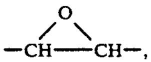, $-CO-$, $-COO-$, $-O\underset{\underset{O}{\|}}{C}O-$, $-CONH-$, $-CONR'-$, $-NR'-$, $-\underset{O-CO-NHR'}{\underset{|}{CH}}-$, $-\underset{O-CO-R'}{\underset{|}{CH}}-$, $-\overset{R}{\underset{R}{Si}}-$, 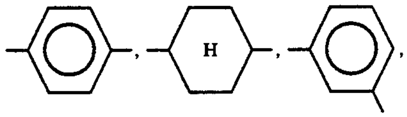,

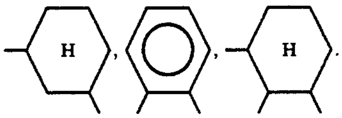.

3. A liquid crystal mixture as claimed in claim 1, wherein the symbols in formula (1) have the following meaning:

a, b, c, d, e, f, independently of one another, are an integer from zero to 3,

—B—, —C—, —E—, —F— are —CH2— —A—, —D—, identical or different, are $-CH_2-$, $-CHR'-$, $-CH=CH-$, 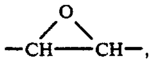, $-CO-$, $-COO-$, $-O\underset{\underset{O}{\|}}{C}O-$, $-CONH-$, $-CONR'-$, $-\underset{O-CO-NHR'}{\underset{|}{CH}}-$, $-\underset{O-CO-R'}{\underset{|}{CH}}-$, 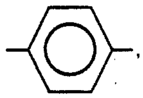,

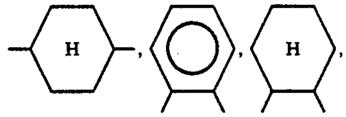, in which

R is alkyl of 1 to 12 carbon atoms and

R' is alkyl of 1 to 12 carbon atoms or phenyl.

4. A liquid crystal mixture as claimed in claim 3, wherein the symbols in formula (1) have the following meaning: —A—, —D—, identical or different, are $-CH_2-$, $-CHR'-$, $-CH=CH-$, 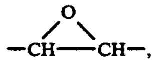, $-CO-$, $-COO-$, $-O\underset{\underset{O}{\|}}{C}O-$, $-\underset{O-CO-NHR'}{\underset{|}{CH}}-$ or $\underset{O-CO-R'}{\underset{|}{CH}}-$.

5. A liquid crystal mixture as claimed in claim 1, which contains 0.01 to 10 mol % of the macrocyclic compound of the general formula (1).

6. An electrooptical switching and display device containing a ferroelectric liquid crystal mixture, two electrodes, two support blades and at least one orientation layer, which contains an ferroelectric liquid crystal mixture containing as one component 0.01 to 10 mol % of a macrocyclic compound as claimed in claim 1.

* * * * *